(12) United States Patent
Tong et al.

(10) Patent No.: US 7,430,490 B2
(45) Date of Patent: Sep. 30, 2008

(54) CAPTURING AND RENDERING GEOMETRIC DETAILS

(75) Inventors: Xin Tong, Beijing (CN); Yanyun Chen, Beijing (CN); Baining Guo, Beijing (CN); Heung-Yeung Shum, Beijing (CN); Jiaping Wang, Beijing (CN); John Michael Snyder, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 297 days.

(21) Appl. No.: 11/277,938

(22) Filed: Mar. 29, 2006

(65) Prior Publication Data

US 2007/0247472 A1    Oct. 25, 2007

(51) Int. Cl.
*G06T 15/40* (2006.01)
(52) U.S. Cl. ....................................... 702/158; 345/421
(58) Field of Classification Search .................. 702/158
See application file for complete search history.

(56) References Cited

U.S. PATENT DOCUMENTS

| | | | |
|---|---|---|---|
| 6,677,942 B1 * | 1/2004 | Rushmeier et al. | 345/420 |
| 6,704,025 B1 * | 3/2004 | Bastos et al. | 345/589 |
| 2003/0231173 A1 * | 12/2003 | Matusik et al. | 345/419 |
| 2005/0280647 A1 * | 12/2005 | Wang et al. | 345/420 |

OTHER PUBLICATIONS

Blinn, J.F.: Simulation of wrinkled surfaces. Computer Graphics (SIGGRAPH '78 Proceedings), 12(3), pp. 286-292, 1978.
Bouguet, J.Y., Perona, P.: 3d photography on your desk. In: IEEE International Conference on Computer Vision (ICCV98), PP. 43-50, 1998.

Cook, R.L.: Shade trees. Computer Graphics (SIGGRAPH '84 Proceedings), 18(3), pp. 223-231, 1984.
Curless, B., Levoy, M.: Better optical triangulation through spacetime analysis. In: IEEE International Conference on Computer Vision (ICCV95), pp. 987-994, 1995.
Dana, K.J.: Brdf/btf measurement device. In: Proceedings of eighth IEEE international conference on computer vision (ICCV), vol. 2, pp. 460-466, 2001.
Dana, K.J., Van Ginneken, B., Nayar, S.K., Koenderink, J.J.: Reflectance and texture of real-world surfaces. ACM Transactions on Graphics, 18(1), pp. 1-34, 1999.
Diefenbach, P.J.: Pipeline Rendering: Interaction and Realism through Hardware-Based Multi-Pass Rendering. Ph.D. thesis, 1996.
Furukawa, R., Kawasaki, H., Ikeuchi, K., Sakauchi, M.: Appearance based object modeling using texture database: Acquisition, compression and rendering. In: Eurographics Workshop on Rendering, pp. 257-266, 2002.

(Continued)

*Primary Examiner*—Bryan Bui
*Assistant Examiner*—Jonathan Moffat

(57) ABSTRACT

A method and system for implementing capturing and rendering geometric details for mesostructure surfaces is described herein. A mesostructure distance function is defined as a function of a given reference point and a given viewing direction. A distance from a reference point to a mesostructure surface point along a viewing direction is measured using the mesostructure distance function. This distance is used to determine the visibility of mesostructure surface for rendering silhouettes. The lighting visibility of the mesostructure surface point may also be determined and used for determining whether the mesostructure surface point is in shadow. This determination may then be used for rendering shadow silhouettes.

20 Claims, 6 Drawing Sheets

OTHER PUBLICATIONS

Han, J.Y., Perlin, K.: Measuring bidirectional texture reflectance with a kaleidoscope. ACM Transactions on Graphics, 22(3), pp. 741-748, 2003.

Heidrich, W., Daubert, K., Kautz, J., Seidel, H.P.: Illuminating micro geometry based on precomputed visibility. In: Computer Graphics (Proceedings of SIGGRAPH 2000), pp. 455-464, 2000.

Hirche, J., Ehlert, A., Guthe, S., Doggett, M.: Hardware accelerated per-pixel displacement mapping. In: GI '04: Proceedings of the 2004 conference on Graphics interface, pp. 153-158. Canadian Human-Computer Communications Society, School of Computer Science, University of Waterloo, Waterloo, Ontario, Canada, 2004.

Kaneko, T., Takahei, T., Inami, M., Kawakami, N., Yanagida, Y., Maeda, T., Tachi, S.: Detailed shape representation with parallax mapping. In: ICAT2001 (11th International Conference on Artificial Reality and Tele-Existence), pp. 205-208, 2001.

Kautz, J., McCool, M.D.: Interactive rendering with arbitrary BRDFs using separable approximations. In: D. Lischinski, G.W. Larson (eds.) Rendering Techniques '99, Eurographics, pp. 247-260. Springer-Verlag Wien New York, 1999.

Koenderink, J.J., Doorn, A.J.V.: Illuminance texture due to surface mesostructure. Journal of the Optical Society of America, 13(3), pp. 452-463, 1996.

Liu, X., Hu, Y., Zhang, J., Tong, X., Guo, B., Shum, H.Y.: Synthesis and rendering of bidirectional texture functions on arbitrary surfaces. IEEE Transactions on Visualization and Computer Graphics, 10(3),pp. 278-289, 2004.

Liu, X., Yu, Y., Shum, H.Y.: Synthesizing bidirectional texture functions for real-world surfaces. Proceedings of SIGGRAPH 2001, pp. 97-106, 2001.

Malzbender, T., Gelb, D., Wolters, H.: Polynomial texture maps. Proceedings of SIGGRAPH 2001 pp. 519-528, 2001.

Mammen, A.: Transparency and antialiasing algorithms implemented with the virtual pixel maps technique. IEEE Computer Graphics and Applications, 9(4), pp. 43-55, 1989.

Max, N.: Horizon mapping: Shadows for bumped mapped surfaces. The Visual Computer, pp. 109-117, 1988.

Mueller, G., Meseth, J., Klein, R.: Compression and real-time rendering of measured BTFs using local PCA. In: Proceedings of Vision, Modeling and Visualisation, 2003.

Policarpo, F., Oliveira, M.M., Comba, J.L.D.: Real-time relief mapping on arbitrary polygonal surfaces. In: ACM SIGGRAPH 2005 Symposium on Interactive 3D Graphics and Games (I3D 2005), 2005.

Rushmeier, H., Balmelli, L., Bernardini, F.: Horizon map capture. In: Proceedings of Eurographics 01, 2001.

Sattler, M., Sarlette, R., Klein, R.: Efficient and realistic visualization of cloth. In: Eurographics Symposium on Rendering, pp. 167-178, 2003.

Sloan, P.P., Cohen, M.F.: Interactive horizon mapping. In: Eurographics Workshop on Rendering, pp. 281-286, 2000.

Sloan, P.P., Liu, X., Shum, H.Y., Snyder, J.: Bi-scale radiance transfer. ACM Transactions on Graphics, 22(3), pp. 370-375, 2003.

Suykens, F., Vom Berge, K., Lagae, A., Dutre, P.: Interactive rendering with bidirectional texture functions. In: Proceedings of Eurographics 03, 2003.

Tong, X., Zhang, J., Liu, L., Wang, X., Guo, B., Shum, H.Y.: Synthesis of bidirectional texture functions on arbitrary surfaces. ACM Transactions on Graphics 21(3), pp. 665-672, 2002.

Vasilescu, M.A.O., Terzopoulos, D.: TensorTextures: multilinear image-based rendering. ACM Transactions on Graphics 23(3), pp. 336-342, 2004.

Wang, L., Wang, X., Tong, X., Lin, S., Hu, S., Guo, B., Shum, H.Y.: View-dependent displacement mapping. ACM Transactions on Graphics 22(3), pp. 334-339, 2003.

Wang, X., Tong, X., Lin, S., Guo, B., Shum, H.Y.: Generalized displacement maps. In: Eurographics Symposium on Rendering 2004, 2004.

Zhang, Z.: Flexible camera calibration by viewing a plane from unknown orientations, In: IEEE International Conference on Computer Vision (ICCV99), pp. 666-673, 1999.

Jiaping Wang et al., Capturing and Rendering Geometry Details for BTF-mapped Surfaces, The Visual Computer, Pacific graphics, 2005.

* cited by examiner

400

Initial stencil buffer;
Enable stencil test;
Enable depth test;
Set Zpeel_next to 0.0;
For each peeling pass
    Set depth buffer Z to far plane;
    Zpeel_now = Zpeel_next;
    Enable depth buffer Z writing;
    Render all back faces;
    For all pixels $p_b$ of back faces
        If $z(p_b) \geq Zpeel\_now(p_b)$ and $z(p_b) < Z(p_b)$
        $Zpeel\_next(p_b) = z(p_b)$;
        Compute $d(p_b)$ with MDF;
        $Z(p_b) = z(p_b) - d(p_b)$;
    Disable depth buffer Z writing;
    Render all front faces;
    For all pixels $p_f$ of front faces
        If $z(p_f) > Zpeel\_now(p_f)$ and $z(p_f) < Z(p_f)$
        Compute the $d(p_f)$ with MDF;
        If $z(p_f) + d(p_f) \leq Z(p_f)$ and $p_f$ is not masked
            Shade $p_f$ with BTF;
            Mask $p_f$ with stencil;

FIG. 4

CAPTURING AND RENDERING GEOMETRIC DETAILS

BACKGROUND

Bidirectional texture functions, or BTFs, model reflectance variation at a meso-scale as a function of lighting and viewing direction. BTF is a 6D function of position p on the reference plane, view direction v, and lighting direction l that records the resulting radiance at p viewed in direction v and lit in direction l. BTFs capture view-dependent visibility variation, also called masking or parallax, but only within surface contours. Mesostructure detail is neglected at silhouettes, so BTF-mapped objects retain the coarse shape of the underlying model.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

Described herein are various technologies and techniques directed to methods and systems for capturing and rendering geometric details for mesostructure surfaces. In accordance with one implementation of the described technologies, a mesostructure distance function (MDF) is defined as a function of a given reference point and a given viewing direction. MDF measurements may then be taken of a material sample. An angle may be computed between a laser plane and a reference plane. Laser scan images of a material sample may then be recorded. A set of laser scan images is generated. The laser plane for each image is computed. A displacement image for each laser scan image sequence is computed. The displacement images for each viewing direction may then be merged.

In another implementation of the described technologies, a first distance is measured from a first reference point on a front face of a base geometry to a first mesostructure surface point along a first viewing direction using the mesostructure distance function. A second distance is measured from a second reference point on a back face of the base geometry to a second mesostructure surface point along a second viewing direction using the mesostructure distance function. The first distance is added to the second distance to obtain a third distance. The thickness of the base geometry is determined by measuring a fourth distance between the first reference point and the second reference point. A determination is made as to whether the mesostructure is visible based on whether the fourth distance is greater than the third distance. This method is performed for different pairs of corresponding points on the front and back face of the base geometry and used to render silhouettes of the mesostructure surface.

In another implementation of the described technologies, an intersection point of a viewing ray and a mesostructure surface is determined using the mesostructure distance function. The lighting source visibility of the intersection point is determined. Shadow silhouettes of the mesostructure surface may then be rendered based on the lighting source visibility determinations.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein:

FIG. 4 illustrates exemplary pseudo code for silhouette rendering.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Figure 1:
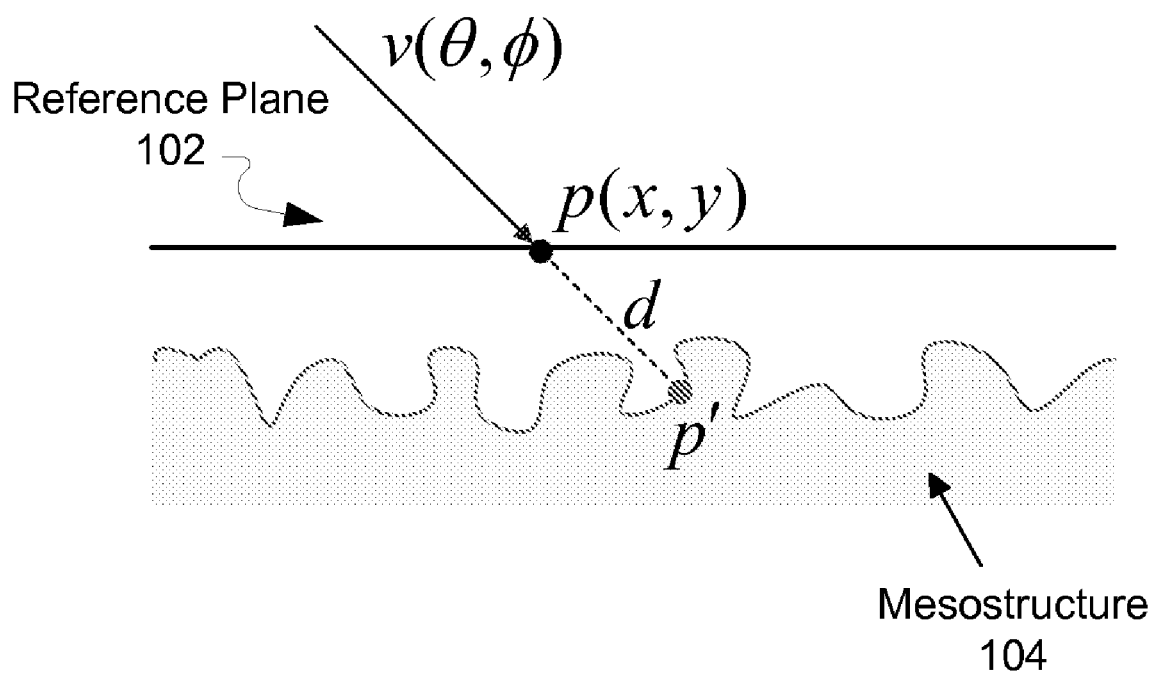
FIG. 1 is a block diagram illustrating the mesostructure distance function.

FIG. 1 is a diagram illustrating the mesostructure distance function (MDF). For a given bidirectional texture function (BTF), the MDF records the distance of the mesostructure surface 104 from a reference surface 102 along a viewing direction. As illustrated in FIG. 1, the MDF is a 4D function $d=D(x, y, \theta, \phi)$, where $(x, y)$ is the texture coordinate, and the unit vector $(\theta, \phi)$ is a sample viewing direction of the BTF expressed in spherical coordinates. For a given direction $(\theta, \phi)$, each reference surface point $p=p(x, y)$ projects a mesostructure point p' along direction $(\theta, \phi)$, and $D(x, y, \theta, \phi)$ is defined to be the distance from p to p'.

Figure 2:
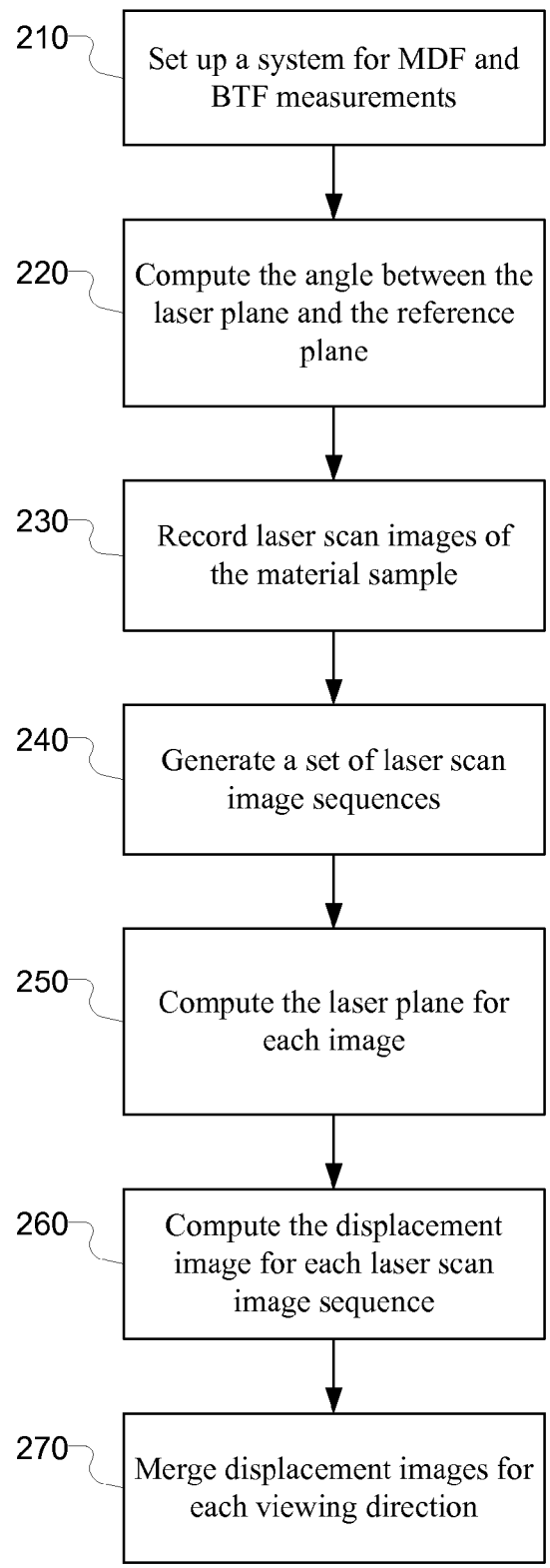
FIG. 2 is a flow diagram illustrating an exemplary process for capturing geometric details.

FIG. 2 is a flow diagram illustrating an exemplary process for capturing geometric details. At 210, a system is set up for the MDF and BTF measurements. For example, a BTF measurement device may include a turntable and two concentric arcs: one arc for light sources and the other arc for cameras. The BTF measurement may be performed by an automated process controlled by a PC. For example, after rotating the light arc and turntable to their desired sampling positions, the PC may sequentially turn on and off the light sources. When the light sources are on, every camera records an image. The captured images are then rectified to form the output BTF data.

The MDF measurement device may include a laser scan unit with a laser source and a controller. A miniature structured light diode laser may serve as a light source, with a 60-degree line lens placed in front of the laser to project a laser strip on the turntable. The controller rotates the laser emitter vertically so that the laser strip scans across the turntable. The line lens direction may be adjusted to ensure that the laser scanning direction on the turntable is orthogonal to the laser strip. The laser unit may be mounted on the light arc. Laser strips are projected onto the material sample to be measured. As the laser strip scans across the sample, each camera records an image sequence.

At 220, the angle between the laser plane and the reference plane (or turntable plane) is computed. The laser strip is projected onto two planes of different heights and the offset of the laser strip in the two planes from the two recorded laser scan images is calculated. From this offset, the angle between the laser plane and the reference plane is derived. At 230, laser scan images of the material sample are recorded. The light arc and turntable are rotated to the desired sampling position and as the laser strip scans across the material sample, an image sequence is recorded by each camera. At 240, a set of laser scan image sequences are produced. The image sequence for laser source direction l and viewing direction v is $\{I_{v,l}(x, y, t_i)\}$.

At 250, the laser plane for each image $I_{v,l}(x, y, t_i)$ is computed. The laser line is detected in the image. Using a bounding box of the material sample, $I_{v,l}(x, y, t_i)$ is divided into two parts: the reference region showing only the turntable and the sample region where the material sample is imaged. The bounding box may be specified on the reference plane before capturing. The laser strip should be a line in the reference region, since it is flat. To find this line, the reference region is searched for candidate pixels on the line along the laser scan direction. After finding the candidate pixels, a line is fitted to them. The laser plane for the image $I_{v,l}(x, y, t_i)$ is then calculated by projecting the laser line from $I_{v,l}(x, y, t_i)$ to the 3D reference plane.

At 260, from each laser scan image sequence $\{I_{v,l}(x,y,t_i)\}$, the displacement image $D_{v,l}(x, y)$ may be computed using space-time analysis. For each pixel $(x_s, y_s)$ in the sample region, the temporal sequence $\{I_{v,l}(x_s, y_s, t_i)\}$ is searched to find the pixel $(x_s, y_s, t_{i0})$ that has the brightest $I_{v,l}(x_s, y_s, t_{i0})$. If $I_{v,l}(x_s, y_s, t_{i0})$ is greater than the prescribed threshold, then the pixel $(x_s, y_s, t_{i0})$ images a mesostructure point p. p is found by projecting the pixel $(x_s, y_s, t_{i0})$ onto the laser plane of the image $I_{v,l}(x_s, y_s, t_{i0})$. The displacement of p is then computed from the reference plane and the results are recorded in $D_{v,l}(x_s, y_s)$. If $I_{v,l}(x_s, y_s, t_{i0})$ is less than the prescribed threshold, the pixel $(x_s, y_s, t_{i0})$ corresponds to an occluded mesostructure point. In this case, $D_{v,l}(x_s, y_s)$ may be set to equal $-1$. At 270, for every viewing direction v, all displacement images $D_{v,l}(x_s, y_s)$ are merged to generate $D_v(x, y)$.

Figure 3:
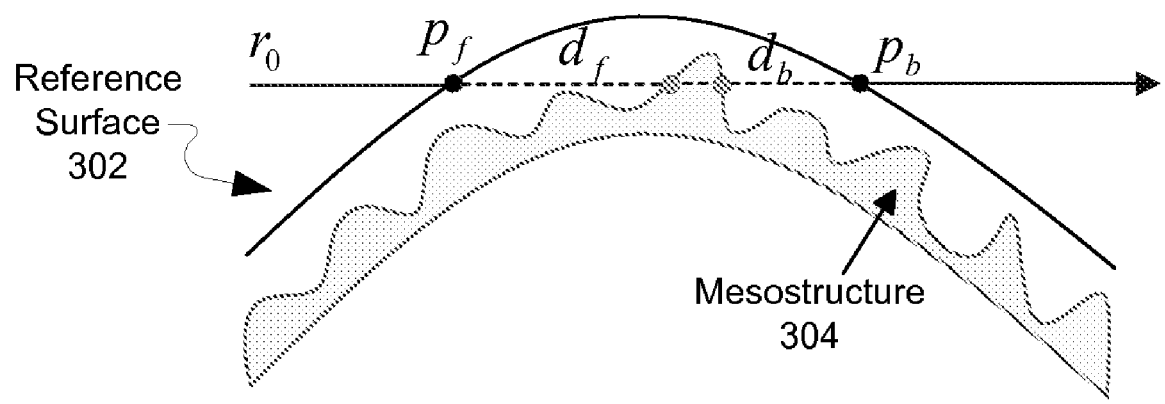
FIG. 3 illustrates an exemplary algorithm for determining mesostructure silhouettes.

FIG. 3 illustrates an exemplary algorithm for determining mesostructure silhouettes. A viewing ray $r_0$ enters the object surface 302 at point $p_f$ on a front face, and leaves at point $p_b$ on a back face. With a MDF value of $D(x_f, y_f, v_f)$ on $p_f$, the offset from $p_f$ to the mesostructure surface 304 along $r_0$ is computed as $d_f = D(x_f, y_f, v_f) s_f$, where $s_f$ is the texture scale at $p_f$, $(x_f, y_f)$ is the texture coordinate at $p_f$ and $v_f$ is the viewing direction of $r_0$ computed in the local coordinate frame at $p_f$. The distance from $p_b$ to the mesostructure surface is $d_b = D(x_b, y_b, v_b) s_b$. As illustrated in FIG. 3, if $d_f + d_b \leq \|p_f - p_b\|$, then the ray $r_0$ will intersect the mapped mesostructure at some point. Otherwise, the ray $r_0$ will pass through the mesostructure without intersection. If the ray intersects the object multiple times, the same computation may be done for each pair of $p_f$ and $p_b$ to determine the visibility of the mesostructure mapped on the surface.

FIG. 4 illustrates an exemplary pseudo code 400 for silhouette rendering. First, the depth buffer and stencil buffer are initialized. Zpeel_now and Zpeel_next are extra depth buffers that store the minimum depth for the current and next peeling pass, respectively. In each peeling pass, the back faces may be rendered via the following process. The Zpeel_now and the depth buffer Z are used to obtain the pixels $P_b$ of the back faces in the current peel layer, whose depths are stored in Zpeel_next. Their depths are then offset with the MDF value and the result $(z_{pb} - d_b)$ is stored in the depth buffer. Then, depth buffer writing is disabled and the front faces are rendered. For pixels $p_f$ that pass the peeling depth test, their offset depths $z_{pf} + d_f$ are compared with $z_{pb} - d_b$ stored in the depth buffer. If $z_{pf} + d_f \leq z_{pb} - d_b$, the ray intersects with the mesostructure detail between $p_f$ and $p_b$. Otherwise, the ray passes through this peeling layer without intersection. For pixels whose rays intersect with mesostructure details, $p_f$ may be shaded with BTF data according to the viewing and lighting conditions. The shaded pixel may then be masked using the stencil buffer so that it will not be corrupted with the surfaces in the following peeling layers. The peeling depth buffer may then be swapped and the next peeling pass may be performed. The number of peeling passes may be predetermined or specified by a user.

Figure 5:
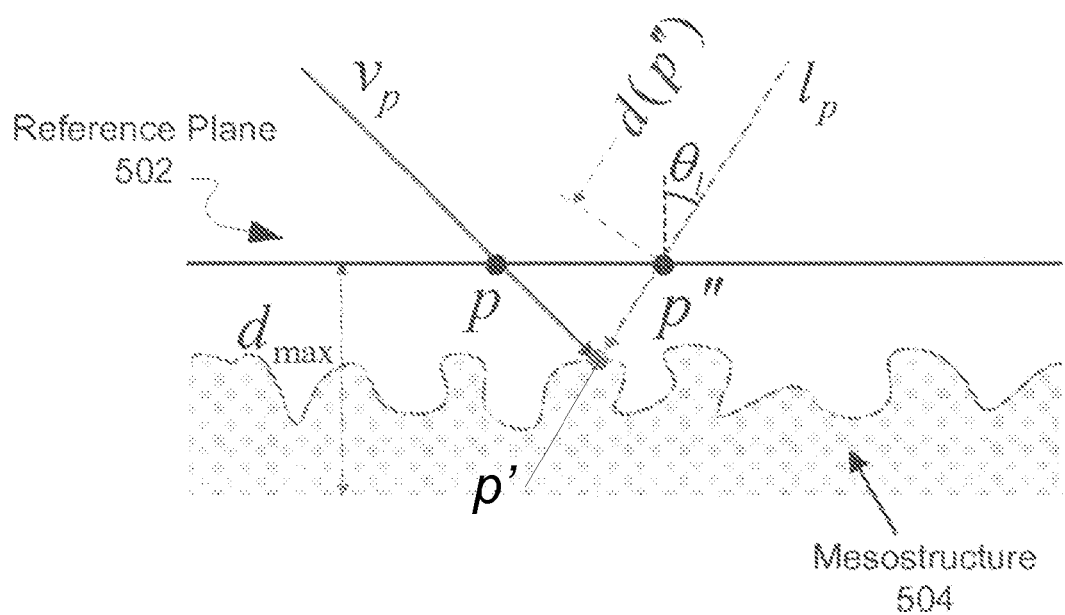
FIG. 5 illustrates an exemplary algorithm for computing shadow geometry.

FIG. 5 illustrates an exemplary algorithm for computing shadow geometry. For each surface point p with texture coordinates $(x, y)$ on a reference surface 502, the intersection point p' of the viewing ray and the mesostructure surface 504 is found. $p' = p + s\,D(x, y, v_p)$, where s is the texture scale at p, and $v_p$ is the viewing direction defined in the local coordinate frame. The shadow map is used to test whether p' is in the macroscale shadow. Since the self-shadowing effect of the mesostructure has been included in the BTF, the shadow map may be generated for a BTF-mapped surface blocker such that the depth of each point is measured from the base of the mesostructure. As illustrated in FIG. 5, at point p", the shadow map depth is $d(p") + (d_{max})/\cos\theta_l$, where $d(p")$ is the depth from the light source calculated using the macro-scale geometry and $d_{max}$ is the maximum depth of the mesostructure.

This algorithm may be integrated with the visibility computation algorithm described above with respect to the pseudo code illustrated in FIG. 4. To generate the shadow map, the $z(p_f) + (d_{max})/\cos\theta_l$ may be written into the shadow buffer, where $\theta_l$ is the light direction computed in the local coordinate frame at $p_f$. To render the final result, the mesostructure point may be computed with depth as $z(p_f) + d(p_f)$ for $p_f$ and this may be tested against the shadow map. Depending on whether a pixel is in shadow, the point p may be shaded with either an ambient term $L_a(x, y, v_p)$ or the BTF value $T(x, y, v_p, l_p)$, where $L_a(x, y, v_p)$ is obtained by integrating the BTF value for all lighting directions $l = (\theta_l, \phi_l)$ on the hemisphere $\Omega$.

Figure 6:
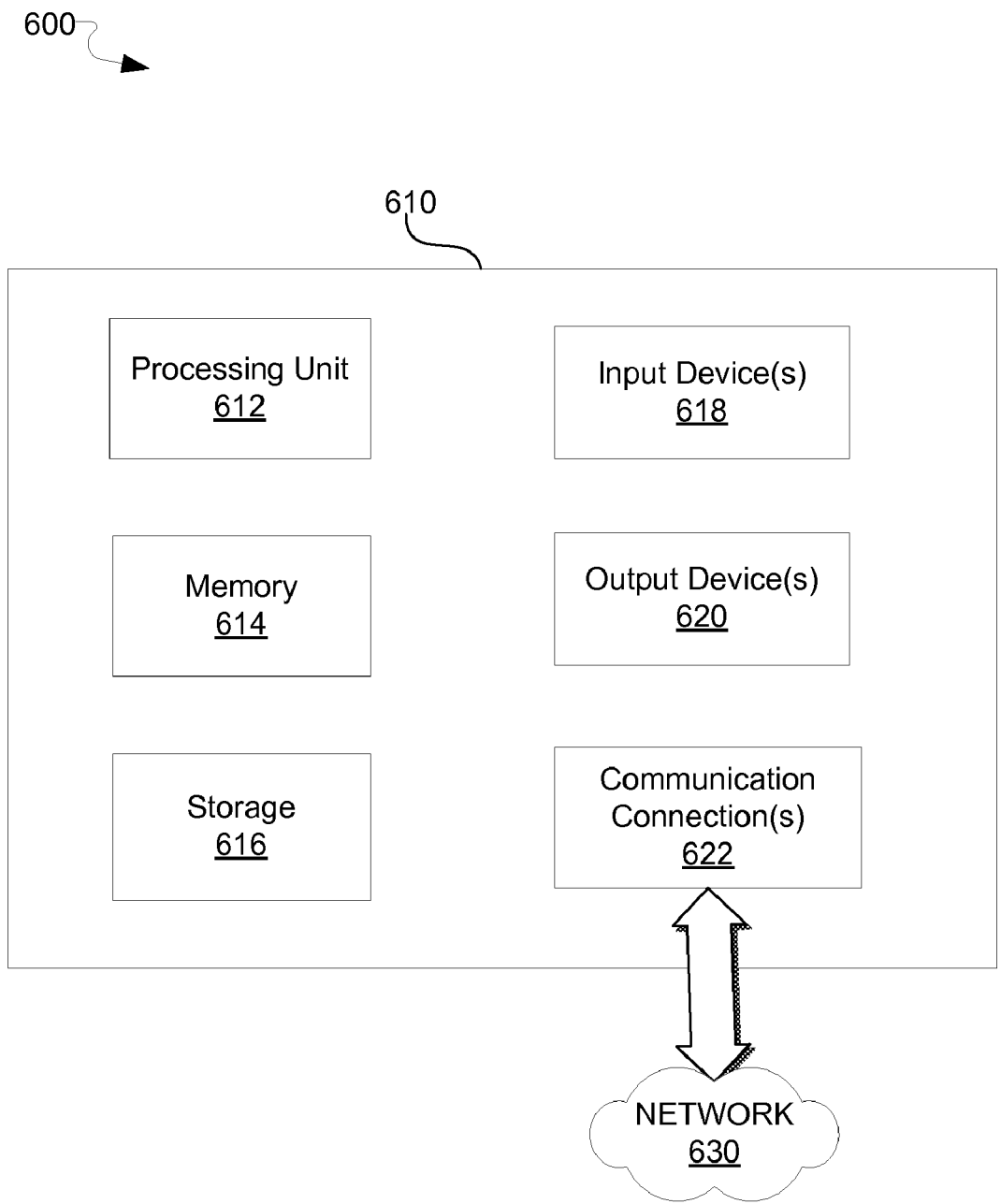
FIG. 6 illustrates an exemplary computing environment in which certain aspects of the invention may be implemented.

FIG. 6 illustrates an exemplary computing environment in which certain aspects of the invention may be implemented. It should be understood that computing environment 600 is only one example of a suitable computing environment in which the various technologies described herein may be employed and is not intended to suggest any limitation as to the scope of use or functionality of the technologies described herein. Neither should the computing environment 600 be interpreted as necessarily requiring all of the components illustrated therein.

The technologies described herein may be operational with numerous other general purpose or special purpose computing environments or configurations. Examples of well known computing environments and/or configurations that may be suitable for use with the technologies described herein include, but are not limited to, personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

With reference to FIG. 6, computing environment 600 includes a general purpose computing device 610. Components of computing device 610 may include, but are not limited to, a processing unit 612, a memory 614, a storage device 616, input device(s) 618, output device(s) 620, and communications connection(s) 622.

Processing unit 612 may include one or more general or special purpose processors, ASICs, or programmable logic chips. Depending on the configuration and type of computing device, memory 614 may be volatile (such as RAM), non-volatile (such as ROM, flash memory, etc.) or some combination of the two. Computing device 610 may also include additional storage (removable and/or non-removable) including, but not limited to, magnetic or optical disks or tape. Such additional storage is illustrated in FIG. 6 by storage 616. Computer storage media includes volatile and nonvolatile, removable and non-removable media implemented in any method or technology for storage of information such as computer readable instructions, data structures, program modules or other data. Memory 614 and storage 616 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 610. Any such computer storage media may be part of computing device 610.

Computing device 610 may also contain communication connection(s) 622 that allow the computing device 610 to communicate with other devices, such as with other computing devices through network 630. Communications connection(s) 622 is an example of communication media. Communication media typically embodies computer readable instructions, data structures, program modules or other data in a modulated data signal such as a carrier wave or other transport mechanism and includes any information delivery media. The term 'modulated data signal' means a signal that has one or more of its characteristics set or changed in such a manner as to encode information in the signal. By way of example, and not limitation, communication media includes wired media such as a wired network or direct-wired connection, and wireless media such as acoustic, radio frequency, infrared, and other wireless media. The term computer readable media as used herein includes storage media.

Computing device 610 may also have input device(s) 618 such as a keyboard, a mouse, a pen, a voice input device, a touch input device, and/or any other input device. Output device(s) 620 such as one or more displays, speakers, printers, and/or any other output device may also be included.

While the invention has been described in terms of several exemplary implementations, those of ordinary skill in the art will recognize that the invention is not limited to the implementations described, but can be practiced with modification and alteration within the spirit and scope of the appended claims. The description is thus to be regarded as illustrative instead of limiting.

The invention claimed is:

1. A method comprising:
   defining a mesostructure distance function as a function of a given reference point and a given viewing direction;
   measuring a first distance from a first reference point on a front face of a base geometry to a first mesostructure surface point along a first viewing direction using the mesostructure distance function;
   measuring a second distance from a second reference point on a back face of the base geometry to a second mesostructure surface point along a second viewing direction using the mesostructure distance function;
   adding the first distance to the second distance to obtain a third distance;
   determining a thickness of the base geometry by measuring a fourth distance between the first reference point and the second reference point; and
   determining whether the mesostructure is visible based on whether the fourth distance is greater than the third distance.

2. The method of claim 1, wherein determining whether the mesostructure is visible based on whether the fourth distance is greater than the third distance comprises determining that the mesostructure is visible when the fourth distance is greater than the third distance.

3. The method of claim 1, further comprising rendering mesostructure silhouettes based on the mesostructure visibility determination.

4. The method of claim 1, wherein the mesostructure distance function is a four-dimensional function based on a two-dimensional reference point and a two-dimensional viewing direction.

5. The method of claim 1, further comprising using a depth peeling algorithm to render silhouettes of the base geometry.

6. The method of claim 5, wherein front face and back face fragment pairs are rendered using the depth peeling algorithm.

7. The method of claim 6, wherein rendering front face and back face fragment pairs using the depth peeling algorithm comprises rendering upon a first peeling pass the nearest fragments on the back face of the base geometry and rendering the nearest fragments on the front face of the base geometry.

8. The method of claim 7, wherein rendering front face and back face fragment pairs using the depth peeling algorithm further comprises rendering upon a second peeling pass the second nearest fragments on the back face of the base geometry and rendering the second nearest fragments on the front face of the base geometry.

9. A method comprising:
   computing an angle between a laser plane and a reference plane;
   recording laser scan images of a material sample;
   generating a set of laser scan image sequences from the laser scan images;
   computing the laser plane for each image; and
   computing a displacement image for each laser scan image sequence by:
      identifying for each pixel in a laser scan image sequence an image where the pixel is brightest,
      comparing a brightness level for the pixel in the image to a threshold; and
      when the brightness level exceeds the threshold, projecting the pixel onto the laser plane and computing a displacement between the projected pixel and the reference plane.

10. The method of claim 9, further comprising merging displacement images for each viewing direction.

11. The method of claim 9, further comprising projecting laser strips onto the material sample.

12. The method of claim 11, wherein computing an angle between a laser plane and a reference plane comprises projecting a laser strip onto two planes of different heights and deriving the angle between the laser plane and the reference plane from the offset of the laser strip in the two planes.

13. One or more device-readable media with device-executable instructions for performing steps comprising:

defining a mesostructure distance function as a function of a given reference point and a given viewing direction;

determining an intersection point of a viewing ray and a mesostructure surface using the mesostructure distance function;

determining a lighting source visibility point of the intersection point on a reference plane; and determining whether the intersection point is in shadow based on the lighting source visibility point.

14. The one or more device-readable media of claim 13, wherein the steps further comprise rendering mesostructure shadow silhouettes based on the light source visibility point determination.

15. The one or more device-readable media of claim 13, wherein the mesostructure distance function is a four-dimensional function based on a two-dimensional reference point and a two-dimensional viewing direction.

16. The one or more device-readable media of claim 13, wherein the steps further comprise using a depth peeling algorithm to render shadow silhouettes.

17. The one or more device-readable media of claim 13, wherein the steps further comprise generating a shadow map with a depth of each point measured from a base of the mesostructure.

18. The one or more device-readable media of claim 16, wherein determining whether the intersection point is in shadow comprises using the shadow map to test whether the intersection point is in a macro-scale shadow.

19. The one or more device-readable media of claim 13, wherein the steps further comprise shading the intersection point with an ambient term if the intersection point is determined to be in shadow.

20. The one or more device-readable media of claim 13, wherein the steps further comprise shading the intersection point with a bidirectional texture function (BTF) value if the intersection point is determined to not be in shadow.

* * * * *